(12) United States Patent
Zinno

(10) Patent No.: US 6,279,723 B1
(45) Date of Patent: Aug. 28, 2001

(54) CONTAINER UPRIGHTING DEVICE

(76) Inventor: William Zinno, 15 Doulton Rd., Pittsburgh, PA (US) 15229

( * ) Notice: Subject to any disclaimer, the term of this patent is extended or adjusted under 35 U.S.C. 154(b) by 0 days.

(21) Appl. No.: 09/422,508

(22) Filed: Oct. 21, 1999

(51) Int. Cl.[7] .................................................. B65G 47/24
(52) U.S. Cl. ............................................................. 198/406
(58) Field of Search ................................... 198/406, 407, 198/409, 399, 410, 372

(56) References Cited

U.S. PATENT DOCUMENTS

| | | | |
|---|---|---|---|
| 4,915,237 | * | 4/1990 | Chang et al. ........................ 198/406 |
| 6,032,784 | * | 3/2000 | Bellanca ............................... 198/406 |

FOREIGN PATENT DOCUMENTS

0066419 * 5/1980 (JP) ...................................... 198/406

* cited by examiner

*Primary Examiner*—Kenneth W. Noland
(74) *Attorney, Agent, or Firm*—David C. Jenkins; Eckert Seamans Cherin & Mellott, LLC

(57) ABSTRACT

A device for uprighting containers which includes a first conveyor, such as a carrier tray conveyor, to transport generally horizontal containers at a first level, a transfer member having a convex surface adjacent to the first conveyor, and a second conveyor, such as a continuous belt conveyor, to transport generally vertical containers at a second level which is lower than the level of the first conveyor. The first conveyor urges the containers from the first conveyor onto the transfer members, causing the containers' orientation to change from horizontal to vertical as the containers pass over the convex surface. After the containers are oriented vertically, the second conveyor moves the containers away for further processing.

27 Claims, 2 Drawing Sheets

CONTAINER UPRIGHTING DEVICE

BACKGROUND OF THE INVENTION

1. Field of the Invention

This invention relates to container processing machines and more specifically to a device to upright containers from a horizontal position to a vertical position.

2. Description of the Prior Art

During the processing of containers, for example food containers, such containers are typically transported between various processing machines by conveyors. Different processing machines may require the containers to be at a different orientation, i.e. horizontal or vertical, to be processed. A device for turning a container from horizontal to vertical is called an uprighting device.

One form of uprighting device comprises a feeding device on a lower level, a rotating drum adjacent to the feeding device with its axis on or about the same plane as the feeding device, and a take-away device located at the top of the drum. Horizontal containers in the lower feeding device are fed intermittently, bottom side first, to a position adjacent to the drum. The rotating drum has a plurality of fingers which will pick up the containers from below and lift the containers as the drum rotates. When the containers reach the top of the drum, they will be vertical and transferred onto the take-away device.

Feeding devices may consist of conveyor belts formed of long concave trays, or carrier trays. A plurality of containers lay horizontally within each carrier tray. The conveyor belt moves intermittently in a direction parallel to the surface of the uprighting device drum. Each carrier tray has a slider device that can be moved from one end of the carrier tray to the other and which has an extension protruding above the top of the carrier tray. A horizontal bar is positioned at an angle across the conveyor belt. The bar is angled toward the drum so that as the horizontal bar contacts the extension located on the sliders, the sliders, and therefore any containers in the carrier tray, are forced toward the drum as the carrier trays advance. Additionally, the conveyor speed and the angle of the bar are coordinated so that for each advance of the conveyor, the slider is advanced one container length toward the drum. In operation, the sliders are positioned at the back end of the carrier trays, i.e. the end furthest from the uprighting drum. Each tray is filed with horizontal containers located between the slider and the drum. For each intermittent advance of the conveyor, one container is forced off the front end of each carrier tray. Therefore, when the carrier trays form a conveyor with each tray filled with a plurality of containers, for each intermittent movement of the conveyor, each carrier tray urges one container toward the edge adjacent to the drum, and a batch of horizontal containers is delivered intermittently to a position adjacent to the drum.

The end of each carrier tray, adjacent to the uprighting device drum, has a slot therein which allows a finger of the uprighting drum device to pass through the carrier tray. The intermittent movement of the conveyor and the rotation of the drum is timed so that while the conveyor is being advanced the drum fingers are not within the plane of the carrier trays. When the conveyor stops, a container is positioned at the front end of the carrier tray, adjacent to the drum. At this point, a finger on the drum passes through the carrier tray slot from below, lifting the container as the drum rotates. When the container is at the top of the drum, it is vertical, and delivered to the take-away device. As such, timing of the advancement of the conveyor belt with the rotation of the drum is critical as the finger must pass through the slot while the conveyor belt is paused. If the belt is not positioned to allow a finger to pass through the slot, the finger will collide with the carrier tray damaging the finger. Alternately, if the finger is within the slot as the belt advances, the belt will contact the finger which also may result in damage.

In addition to the possibility of damage to the carrier tray and/or drum fingers, the prior art uprighting device has the disadvantage of containing multiple gears, motors and various moving parts, to drive and time the rotation of the drum. These parts are expensive and subject to mechanical failure.

Therefore, there is a need for an uprighting device that is not subject to damage from a feeder device.

There is also a need for an uprighting device that will not damage a feeder device.

There is also a need for an uprighting device which eliminates unnecessary mechanical parts which are subject to failure.

SUMMARY OF THE INVENTION

The above described needs have been met by the present invention. The present invention provides for an uprighting device having transfer member with a convex arcuate surface located adjacent to, or slightly below, a first transport means which delivers horizontal containers to the uprighting device. The transfer member's convex surface curves down to a second transport means which carries away the vertical containers. In operation, the first transport means operates intermittently, feeding one or more containers onto the transfer member where gravity pulls the container downwards while the convex arcuate surface causes the orientation of the container to change from horizontal to vertical. A second transport means, such as a conveyor belt, is located at the bottom of the transfer member. Because no parts of the transfer member that interact with the first transport means, the transfer member and the transport means cannot damage each other. Additionally, because the transfer members are stationary, there is no need for complex operating machinery that may be subject to failure.

Some containers may have a high center of gravity and may be subject to tipping when reoriented from the horizontal to the vertical by the transfer member. Tipping may be controlled by a stabilizing device located adjacent to the bottom of the convex arcuate surface. One form of a stabilizing device consists of a plate mounted on a rotating shaft. As the container falls over the convex arcuate surface, the plate is in the vertical position where, should the container start to tip, the container will contact the plate preventing the container from tipping. The vertical plate may then be rotated on the shaft to a horizontal position, thus allowing the vertical containers to be transported underneath the stabilizing device and away from the uprighting device. Because the first transport means works intermittently, the stabilizing device can also be timed to work intermittently so that once a container has been stabilized, it will be released prior to the arrival of the next container.

It is an object of this invention to provide an uprighting device which is not subject to damage from a feeder device.

It is a further object of this invention to provide an uprighting device with few, or no, mechanical parts subject to failure.

It is a further object of this invention to provide an uprighting device which has a stabilizing means.

It is a further object of this invention to provide an uprighting device which is compatible with existing feeder devices.

These and other objects of the invention will be more fully understood from the following description of the invention in reference to the illustrations appended hereto.

DESCRIPTION OF THE PREFERRED EMBODIMENT

Figure 1:
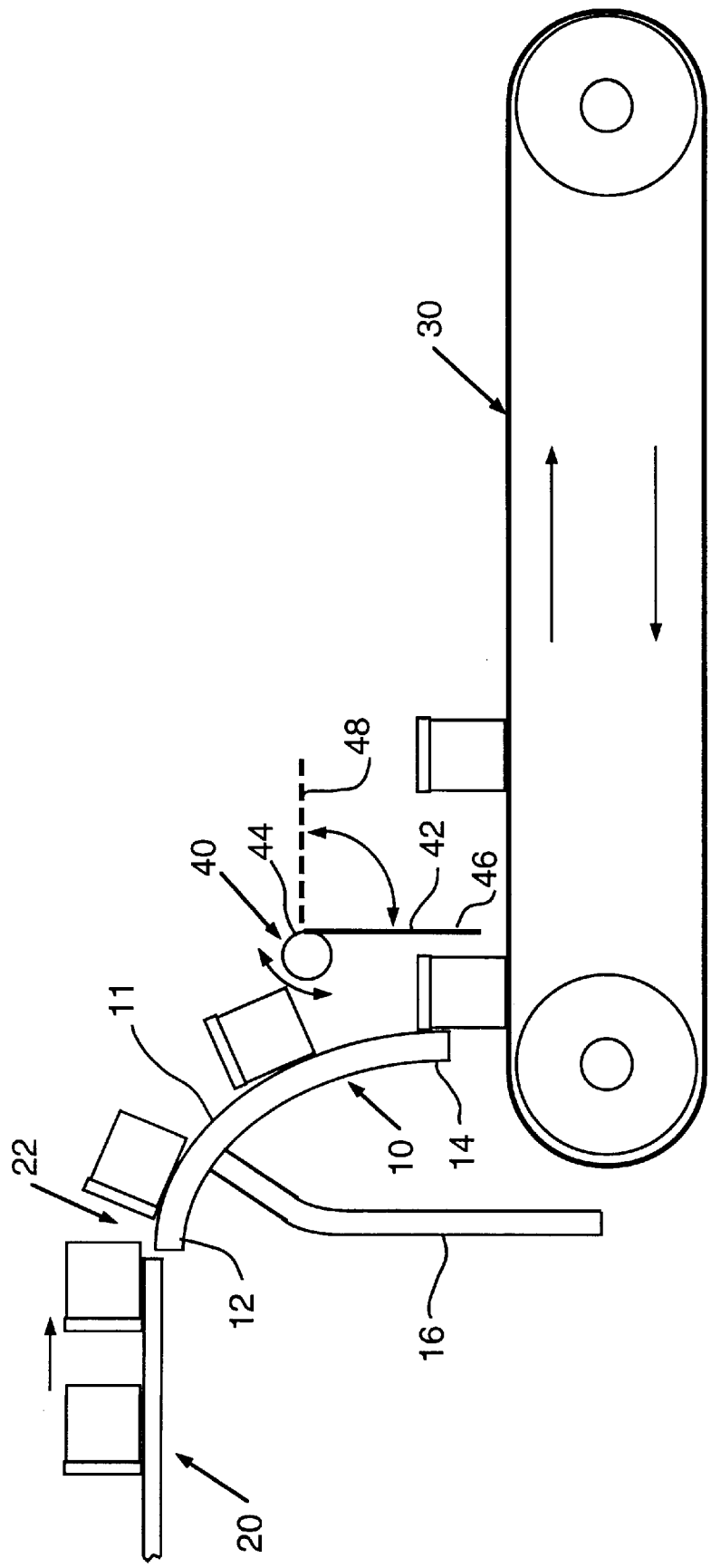
FIG. 1, shows a schematic horizontal elevational view of an uprighting device.

FIG. 1, shows a horizontal elevational view of an uprighting device according to the present invention. The uprighting device includes a first transport means 20, such as a carrier tray feeder which is known in the prior art, located on a first level, a transfer member 10 having a convex surface 11, and a second transport means 30, such as a conveyor belt located at a second, lower level for transporting the containers in a vertical orientation. In the preferred embodiment, the first transport means 20 and the second transport means 30 are horizontal. However, either or both the first or second transport 20, 30 means can be at an angle up to fifteen degrees.

Also in the preferred embodiment, the transfer member 10 is shaped as an elliptical arc having its major axis along the vertical axis and its minor axis along the horizontal axis. The elliptical arc has an upper end 12 and a lower end 14. Upper end 12 is disposed adjacent to first transport means 20. Upper end 12 may be aligned with or slightly below the edge 22 of the first transport means 20. The convex surface 11 is shaped so that a line running tangent to upper end 12 of convex surface 11 would be approximately horizontal and a line running tangent to lower end 14 of convex surface 11 would be approximately vertical. Lower end 14 terminates above the second transport means 30. The transfer member 10 is supported by an arm 16 that extends between the first transport means 20 and the second transport means 30.

In operation, a container in a horizontal orientation will be carried on first transport means 20 towards transfer member 10. The first transport means 20 urges the container to pass over edge 22. As the container leaves the first transport means 20, the container passes onto transfer member 10 where gravity will cause the container to be drawn over the transfer member 10. As the container travels over transfer member 10, it will slide along the convex surface 11 until the container reaches lower end 14. The convex surface 11 causes the orientation of the container to change so that, upon reaching lower end 14, the container will be vertical. At lower end 14, the container will land on the second transport means 30 where it may be transported away for further processing.

To ensure that the container maintains its forward motion after leaving first transport means 20, the convex surface 11 must be shaped to allow the container's weight to overcome the frictional force between the container and convex surface 11, thereby allowing the container to slide over the convex surface 11. Accordingly, the shape of the convex surface will depend upon the size of the container to be uprighted. The convex surface 11, should also be formed of a material with a low coefficient of friction, such as certain plastics.

Figure 2:
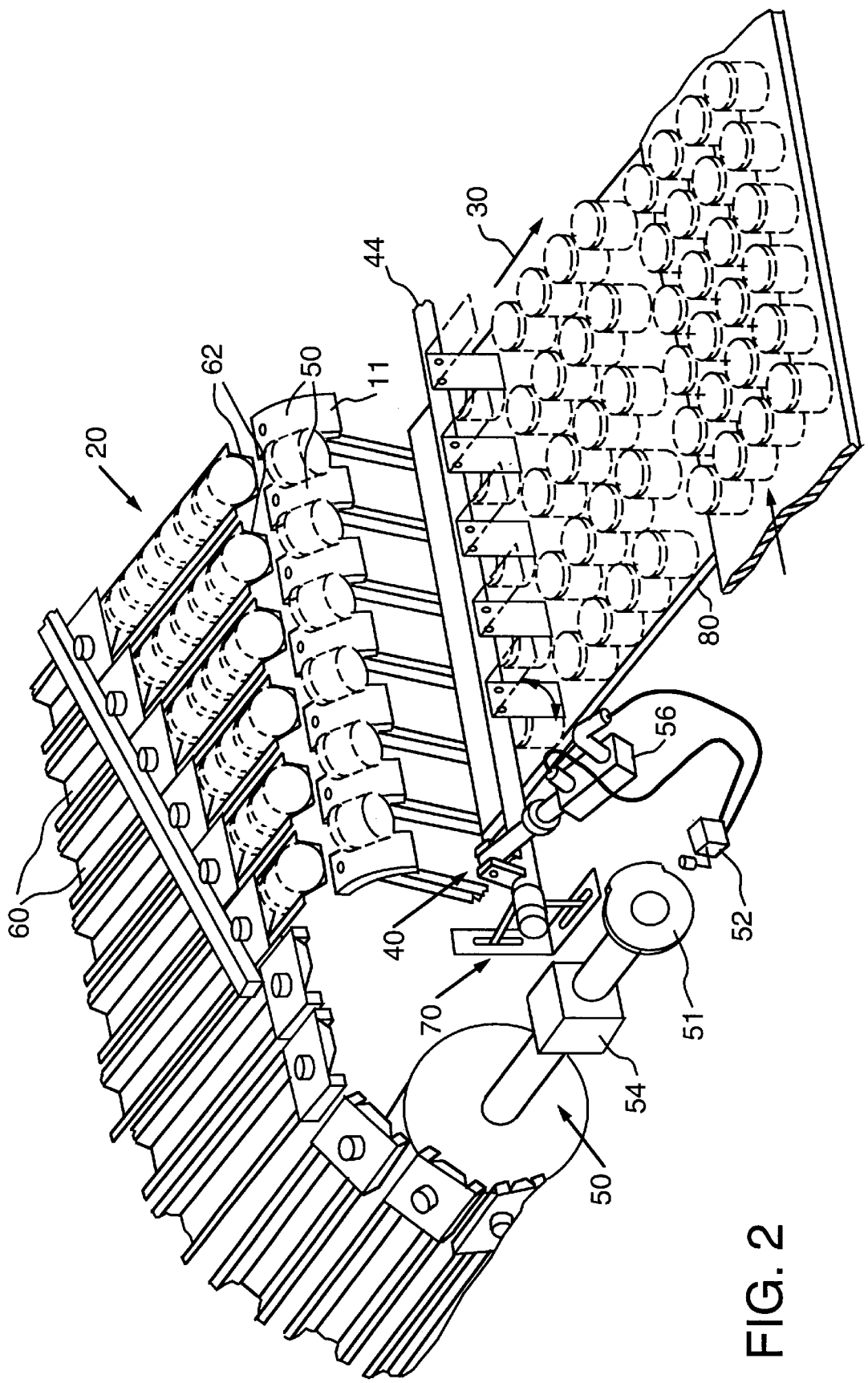
FIG. 2, shows a perspective view of an uprighting device.

When a container traverses convex surface 11 and lands on second transport means 30 in the vertical position, there is a tendency for the container to tip forward. To prevent the containers from falling forward upon reaching the bottom of transfer member 10, a stabilizing means 40 may be used. In the preferred embodiment, the stabilizing means consists of a flat plate 42 which is rotatably mounted on a shaft 44. The plate 42 and shaft 44 may be rotated between a first position 46 and a second position 48 (shown in ghost). In the first position 46, the plate 42 is vertical. In the second position 48, the plate 42 is horizontal. The shaft 44 is spaced apart from lower end 14 so that a container may fall along convex surface 11 without contacting shaft 44 or plate 42. The distance between plate 42, while it is in the first position 46 and lower end 14, is slightly larger than the diameter of a container. As shown on FIG. 2, the stabilizing means may be mounted on an adjustable base 70 as described below. When the first transport means 20 operates intermittently, the rotation of shaft 42 may be controlled by a linkage 50 which includes a cam 51, a control switch 52, an actuator 56, and a gear box 54. Cam 50 contacts a control switch 52 which operates the actuator 56 that rotates shaft 42. The linkage 50 will time the rotation of shaft 42 so that one container will be moved away from the transfer member 10 by second transport means 30 before another container traverses the convex surface 11.

In operation the stabilizing means 40 works as follows. After a container traverses the convex surface 11 reaching lower end 14, the container may tilt forward whereupon it would contact plate 42 which is in the first position 46, thus preventing the container from falling over. At this time it would be resting on second transport means 30. To allow second transport means 30 to carry the container away, the shaft 44 would rotate the plate 42 into the second position 48 allowing the container to pass under shaft 44.

The first transport means 20 may consist of conveyor made from a plurality of concave carrier trays 60. As described above, such a carrier tray feeder 60 operates intermittently and will advance a plurality of containers to the edge 62 of the carrier tray conveyor 60. Therefore, in the preferred embodiment, the uprighting device consists of a plurality of aligned transfer members 50 each with a convex surface 11. The transfer members 50 are positioned adjacent to carrier tray conveyor edge 62. As the carrier tray conveyor 60 advances intermittently, a row of containers will advance beyond the carrier tray conveyor edge 62 and slide over the convex surfaces 11 of the transfer members 50. As described above, as the containers travel over the convex surface 11, the containers are reoriented from the horizontal to the vertical.

Additionally, in the preferred embodiment, the stabilizing means 40 consists of a shaft 44 which extends the entire length of the carrier tray conveyor edge 62. The shaft 44 is mounted on an adjustable base 70 which can position the shaft 44 at various distances from the convex surface 11 and at various heights above the second transport means 30. As such, the stabilizing means 40 can be adjusted to accommodate containers of various diameters and heights. The rotation of the shaft 42 can be timed to correspond with the advancing of the carrier tray conveyor means 60 so that one row of containers is released by the stabilizing means 40 just prior to the advancement of the carrier tray conveyor 60 which will drop another plurality of containers over the transfer members 50.

The second transport means 30 can be a simple continuous belt conveyor 80. The conveyor 80 should be operated at a speed that will advance containers beyond the stabilizing means 40 prior to the fall of the following batch of containers. Additionally, when containers have a low center of gravity, the stabilizing means may not be required. If there is no stabilizing means, the conveyor 80 should run fast enough to remove containers from the end of transfer members 50 so that the following batch will not fall on top of the prior batch, but slow enough so that the containers are not tipped over upon contacting the conveyor 80.

This invention may be practiced with containers made from a variety of materials such as glass, metal or plastic. The containers may be of any size, but the preferred embodiment handles containers between 2.5 ounces and 6.0 ounces. The containers may have any shape, but are preferably cylindrical, or have a cylindrical portion. Finally, the containers are preferably empty, but the invention may be practiced with filled containers as well.

While certain embodiments of the invention have been described herein for the purpose of illustration, it will be evident to those skilled in the art that numerous variation of the details may be made without departing from the invention as described in the following claims. For example, the stabilizing means 40 may consist of a sheet of flexible material that is rigid enough to prevent the containers from tipping over, yet flexible enough to allow the vertical transport means 30 to transfer the containers under the flexible material.

What is claimed is:

1. A device for uprighting containers comprising:
   a first transport means for transporting generally horizontally oriented containers at a first level said first transport means having a front edge;
   a transfer member having a convex surface adjacent to said front edge;
   a second transport means for transporting generally vertically oriented containers at a second level which is lower than said first level and disposed below said transfer member;
   where said first transport means urges said generally horizontally oriented containers over said front edge onto said transfer member, to cause the orientation of said generally horizontally oriented containers to change from horizontal to vertical as said containers pass over said convex surface.

2. The device of claim 1, wherein said transfer member is disposed below said front edge.

3. The device of claim 1, wherein said convex surface is generally an elliptical arc having its major axis along the vertical axis and its minor axis along the horizontal axis.

4. The device of claim 3, wherein said convex surface is made from plastic.

5. The device of claim 3, wherein said first and second transport means are generally parallel.

6. The device of claim 3, wherein said first and second transport means are generally horizontal.

7. The device of claim 1, further comprising a means to stabilize said vertical containers.

8. The device of claim 7, wherein said stabilizing means is disposed adjacent to said transfer member.

9. The device of claim 8, wherein said stabilizing means comprises a plate rotatably mounted on a shaft.

10. The device of claim 9, wherein said plate and shaft have a first position where said plate is vertical and a second position where said plate is horizontal.

11. The device of claim 10, wherein said first transport means urges said containers over said edge intermittently.

12. The device of claim 11, wherein said plate rotates intermittently.

13. The device of claim 12, wherein said plate is timed to rotate to the horizontal position when said first transport means is at rest.

14. The device of claim 13 wherein said first transport means is a carrier tray conveyor belt.

15. The device of claim 14 wherein said second transport means is a continuous conveyor belt.

16. The device of claim 15 wherein said containers are metal.

17. The device of claim 16 wherein said containers are glass.

18. The device of claim 17 wherein said containers are plastic.

19. The device of claim 18 wherein said containers are at least partially cylindrical.

20. The device of claim 19 wherein said containers are empty.

21. A method of uprighting horizontally oriented containers comprising the steps of:
   providing:
      (a) a first transport means at a first level;
      (b) a transfer member having a convex surface;
      (c) a second transport means at a second level which is lower than said first level and disposed below said transfer member;
   transporting generally horizontally oriented containers on said first transport means;
   passing said containers over said transfer member causing said container's orientation to be changed from horizontal to vertical;
   transporting generally vertically oriented containers on said second transport means.

22. The method of claim 21, further comprising the steps of:
   providing:
      a means to stabilize said generally vertical containers;
      stabilizing said containers after said containers become generally vertically oriented.

23. The method of claim 22, wherein said stabilizing means is disposed adjacent to said transfer member.

24. The method of claim 23, wherein said stabilizing means comprises a plate rotatably mounted on a shaft.

25. The method of claim 24, wherein said plate and shaft have a first position where said plate is vertical and a second position where said plate is horizontal.

26. The method of claim 25, further comprising the step of:
   intermittently urging said containers from said first transport means onto said transfer member.

27. The method of claim 26 further comprising the step of:
   intermittently rotating said stabilizing means to allow said second transport means to carry said generally vertically oriented containers away from said transfer members.

* * * * *